United States Patent
Patana

(10) Patent No.: US 10,543,837 B2
(45) Date of Patent: Jan. 28, 2020

(54) MITIGATING BODILY INJURY IN VEHICLE COLLISIONS BY REDUCING THE CHANGE IN MOMENTUM RESULTING THEREFROM

(71) Applicant: Microsoft Technology Licensing, LLC, Redmond, WA (US)

(72) Inventor: Tero J. Patana, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/665,065

(22) Filed: Jul. 31, 2017

(65) Prior Publication Data

US 2019/0031189 A1 Jan. 31, 2019

(51) Int. Cl.
*B60W 30/085* (2012.01)

(52) U.S. Cl.
CPC ....... *B60W 30/085* (2013.01); *B60W 2420/52* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 6,405,132 B1 | 6/2002 | Breed et al. | |
| 8,000,897 B2 | 8/2011 | Breed et al. | |
| 9,108,582 B1* | 8/2015 | Kozloski | B60R 21/0132 |
| 9,514,647 B2 | 12/2016 | Moshchuk et al. | |
| 9,701,307 B1 | 7/2017 | Newman et al. | |
| 2004/0090117 A1 | 5/2004 | Dudeck et al. | |
| 2012/0268310 A1 | 10/2012 | Kim | |
| 2016/0167519 A1* | 6/2016 | Luke | B60L 3/0015 701/22 |

(Continued)

FOREIGN PATENT DOCUMENTS

| | | | |
|---|---|---|---|
| EP | 1852323 A1 | 11/2007 | |
| FR | 2915160 A1 | 10/2008 | |

OTHER PUBLICATIONS

"International Search Report and Written Opinion Issued in PCT Application No. PCT/US2018/034975", dated Aug. 31, 2018, 10 Pages.

(Continued)

*Primary Examiner* — Richard M Camby
(74) *Attorney, Agent, or Firm* — Fiala & Weaver P.L.L.C.

(57) ABSTRACT

Methods, systems, and computer program products are described herein for automatic collision avoidance and/or bodily injury mitigation. For example, a vehicle determines the optimal action(s) to take to avoid a collision or reduce the bodily injury of occupant(s) of the vehicle in the event that the vehicle determines that the collision is unavoidable. The vehicle performs action(s) that reduce the change of momentum experienced by occupant(s) thereof as a result of the collision. The actions are based on various characteristics of the vehicles that are to be involved in the collision. Such actions may comprise accelerating into and causing a collision with vehicle(s) in front of the vehicle at or around the same time at which a further vehicle rear-ends the vehicle. The system processes several scenarios in real-time (taking into changes of velocity of the vehicles involved) to determine the scenario that best mitigates the change of momentum.

20 Claims, 7 Drawing Sheets

(56) References Cited

U.S. PATENT DOCUMENTS

| | | |
|---|---|---|
| 2016/0185348 A1 | 6/2016 | Miura et al. |
| 2016/0368440 A1 | 12/2016 | Trollope et al. |
| 2017/0001636 A1 | 1/2017 | Laur et al. |
| 2017/0247040 A1* | 8/2017 | Miller .................. B60W 10/04 |
| 2017/0248950 A1* | 8/2017 | Moran .................. G08G 1/165 |
| 2017/0248953 A1* | 8/2017 | Kelley ............... B62D 15/0265 |
| 2019/0011910 A1* | 1/2019 | Lockwood ........... G05D 1/0038 |

OTHER PUBLICATIONS

"Reducing forces in car crashes", https://web.archive.org/web/20130618014127/http:/www.bbc.co.uk/schools/gcsebitesize/science/add_ocr_pre_2011/explaining_motion/forcesandmotionrev4.shtml, Published on: Jun. 18, 2013, 2 pages.

Roy, et al., "Communication Based Accident Avoidance and Congestion Control Mechanism in VANETs", In Proceedings of IEEE International Symposium on Advanced Computing and Communication, Sep. 14, 2015, 8 pages.

\* cited by examiner

MITIGATING BODILY INJURY IN VEHICLE COLLISIONS BY REDUCING THE CHANGE IN MOMENTUM RESULTING THEREFROM

BACKGROUND

Many bodily injuries in mid-to-severe accidents are caused by a sudden change in speed or direction. While drivers may attempt to perform evasive actions to avoid such accidents, such evasive actions are generally performed by impulse, and thus do not always mitigate the sudden change in speed or direction well. In fact, such evasive actions sometimes result in more severe accidents than would occur if no action was taken. Human drivers simply do not have enough time to react, or the visual or mental capacity to determine the best course of action to take in time critical scenarios for accident mitigation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques, including methods, systems, and apparatuses, are described herein directed to automatic collision avoidance and/or bodily injury mitigation. For example, an automatic collision avoidance and/or bodily injury mitigation system for a vehicle may determine the optimal action(s) to take to avoid a collision or reduce the bodily injury of one or more occupants of the vehicle in the event a collision is determined to be unavoidable. Actions may be determined and performed that reduce, including minimizing, the change of momentum experienced by occupant(s) of the vehicle as a result of the collision, thereby reducing the acceleration (also referred to as "g-forces") experienced by such occupant(s). The actions may be based on various characteristics of the vehicles (e.g., mass, velocity, braking capabilities, estimated velocity at impact, etc.) that are to be involved in the collision. Such actions may comprise accidence avoidance via evasive maneuvers, deceleration, or acceleration, including accelerating into a collision with a second vehicle in front of (or elsewhere relative to) the first vehicle operating the automatic collision avoidance/bodily injury mitigation system at or around the same time at which a third vehicle rear-ends the first vehicle. Several scenarios may be processed in real-time (taking into changes of velocity of the vehicles involved) to determine the scenario that best mitigates the change of momentum.

Further features and advantages, as well as the structure and operation of the disclosed subject matter, are described in detail below with reference to the accompanying drawings. It is noted that the scope of the present specification is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
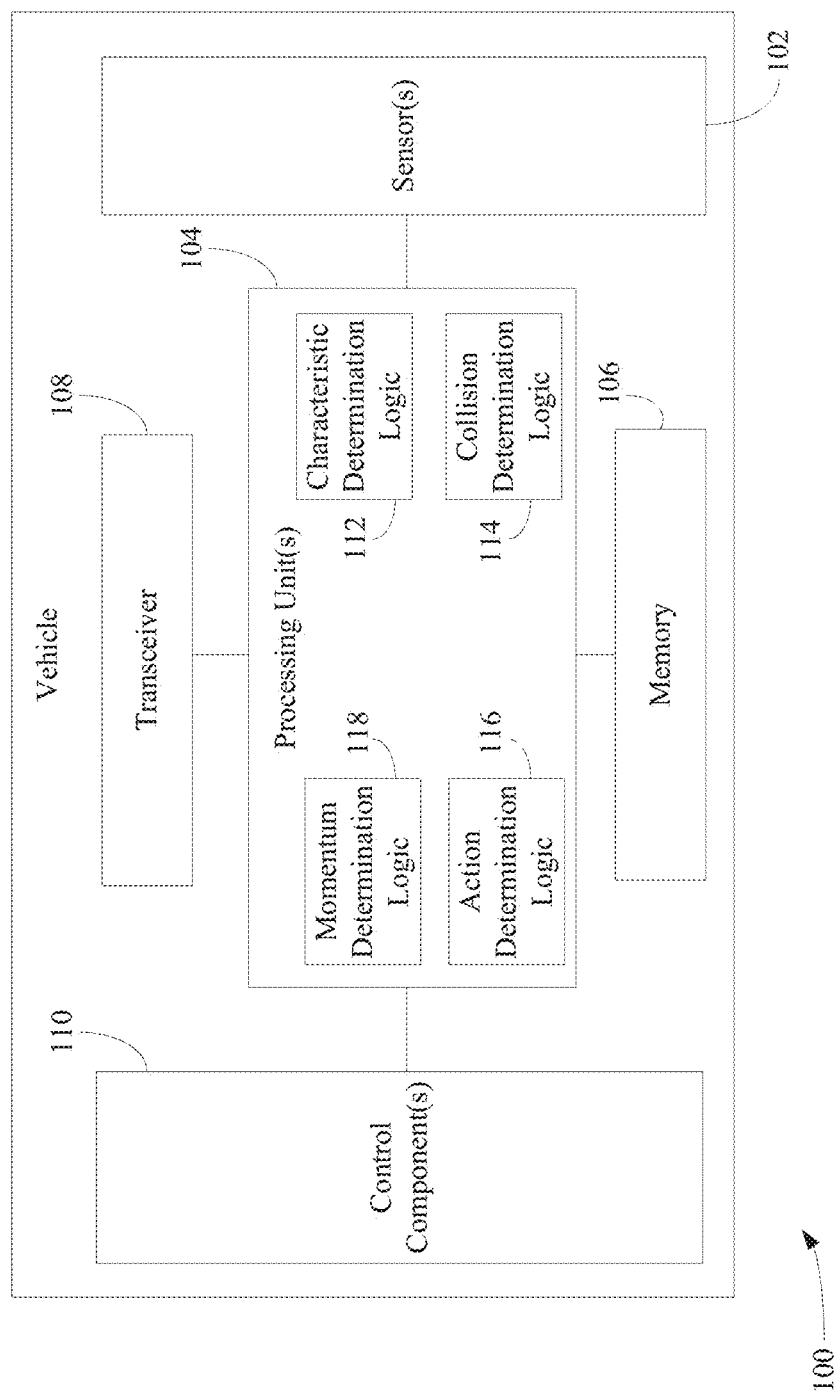
FIG. 1 is a block diagram of a vehicle that includes an automatic collision avoidance and/or bodily injury mitigation system that reduces a change of momentum to be experienced by one or more occupants of a vehicle during a collision with another vehicle in accordance with an embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example embodiments. The scope of the present specification is not limited to the disclosed embodiments, but also encompasses combinations of the disclosed embodiments, as well as modifications to the disclosed embodiments.

References in the specification to "one embodiment," "an embodiment" "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Reducing a Change of Momentum to be Experienced by Occupant(s) of a Vehicle During a Collision with Another Vehicle Techniques described herein are directed to automatic collision avoidance and/or bodily injury mitigation. For example, an automatic collision avoidance and/or bodily injury mitigation system for a vehicle may determine the optimal action(s) to take to avoid a collision or reduce the bodily injury of occupant(s) of the vehicle in the event that the system determines that the collision is unavoidable. The system may perform actions that reduce the change of momentum experienced by occupant(s) of the vehicle as a result of the collision, thereby reducing the acceleration (or g-forces) experienced by such occupant(s). For example, the system may minimize the change of momentum experienced by the occupant(s). The actions may be based on various characteristics of the vehicles (e.g., mass, velocity, braking capabilities, estimated velocity at impact, etc.) that are to be involved in the collision. Such actions may comprise accelerating into and causing a collision with the vehicle in front of the vehicle operating the automatic collision avoidance and/or bodily injury mitigation system at or around the same time at which another vehicle rear-ends the vehicle. The system may process several scenarios in real-time (taking into changes of velocity of the vehicles involved) to determine the scenario that best mitigates the change of momentum.

FIG. 1 shows a block diagram of a vehicle 100 that includes an automatic collision avoidance and/or bodily injury mitigation system that reduces a change of momentum to be experienced by one or more occupants of vehicle 100 during with a collision with another vehicle, according to an example embodiment. As shown in FIG. 1, vehicle 100 includes one or more sensors 102, one or more processing units 104, a memory 106, a transceiver 108, and one or more control components 110. Processing unit(s) 104 includes characteristic determination logic 112, collision determination logic 114, action determination logic 116, and momentum determination logic 118.

Sensor(s) 102 are configured to detect whether one or more vehicles are in proximity to vehicle 100 and/or determine one or more characteristics of such vehicle(s). Examples of sensor(s) 102 include cameras (e.g., video cameras, image capturing cameras, etc., including digital cameras such as charge-coupled device (CCD) cameras or CMOS cameras, etc.), proximity sensors, motion sensors, ultrasonic sensors etc.

For example, sensor(s) may comprise one or more cameras that are configured to obtain image data and/or video data of one or more areas surrounding vehicle 102 (e.g., an area behind of vehicle 100, in front of vehicle 100, the driver side of vehicle 100, and/or the passenger side of vehicle 100 that is opposed to the driver side). The data collected by the camera(s) is provided to characteristic determination logic 112 of processing unit(s) 104. Characteristic determination logic 112 may be configured to perform an image and/or video recognition process on the image and/or video data to identify the type, make, and/or model of the vehicle(s) recognized via the image and/or video recognition process. Examples of type include but are not limited, a car, a pickup truck, a semi-trailer truck, a van, a sport utility vehicle (SUV), a motorcycle, etc. Make refers to the manufacturer of the vehicle(s) (e.g., Chevrolet®, Ford®, Honda®, Toyota®, etc.). Model refers to the particular name that a manufacturer has given to a particular vehicle (e.g., Impala, Focus, Accord, Camry, etc.).

Characteristic determination logic 112 may be configured to determine or estimate certain characteristics of the identified vehicle(s), including distance to the vehicle(s), velocity of the vehicle(s), relative position of the vehicle(s), as well as characteristics based on the identified type, make and/or model of the vehicle(s), and/or other sensor data obtained by sensor(s) 102. Such characteristics include, but are not limited to, the mass or weight of the identified vehicle(s), the braking force (i.e., the force that slows the vehicle upon the driver applying the brakes) applied by the identified vehicle(s), and/or an estimate of energy absorbed at the time of impact by one or more crumple zones of the vehicle for different types of impact (e.g., from a direct impact to the rear of vehicle, a 45 degree impact at various portions of the crump zone, 60 degree impact at various portions of the crumple zone, etc.).

For example, memory 106 may comprise a database that stores one or more characteristics for different types, makes and/or models of vehicles. Upon identifying the type, make and/or model of a vehicle, processing unit(s) 104 may access memory 106 to retrieve characteristic(s) of interest for the identified vehicle. Alternatively, processing unit(s) 104 may access a database that is remotely located from vehicle 102. For example, a remote database that stores characteristic(s) for different types, makes and/or models of vehicles may be maintained by a centralized computing device (e.g., server). Characteristic determination logic 112 may obtain the characteristics for the identified vehicle(s) from the remote database via transceiver 108. Still further, processing unit(s) 104 may obtain such characteristic(s) directly from the identified vehicle(s). For example, vehicle 100 may be communicatively coupled to other vehicle(s) also having a transceiver. The other vehicles may provide such characteristic(s) to vehicle 100 via transceiver 108. Transceiver 108 may be configured to transmit and receive information according to any suitable communication standard or technology, such as GSM, 3G, 4G, 5G, etc.

Characteristic determination logic 112 may be further configured to determine (including accessing in storage) certain characteristics of vehicle 100. Such characteristics include, but are not limited to, a mass or weight of the vehicle 100, braking capabilities of vehicle 100, acceleration capabilities of the vehicle 100, steering capabilities of the vehicle 100, an estimate of energy absorbed at the time of impact by one or more crumple zones of the vehicle 100 for different types of impact, the length of vehicle 100), etc. Examples of braking capabilities include the type of braking system used by vehicle 100 (e.g., disc brakes, drum brakes, etc.), brake pad material, tire pressures, tire tread and grip, suspension system, the braking force of vehicle 100, etc. Examples of steering capabilities include, but are not limited to, power steering, the turning radius of vehicle 100. Such characteristic(s) may be stored in and retrieved from memory 106. Other characteristics may include the speed and/or velocity at which vehicle 100 is traveling. Characteristic determination logic 112 may be communicatively coupled to a speedometer (not shown) of vehicle 100 to determine the speed and/or velocity at which vehicle 100 is traveling.

Sensor(s) 102 may further comprise one or more Radio Detection and Ranging (RADAR) or Light Detection and Ranging (LIDAR)-based devices, which are configured to transmit a signal (e.g., a radio wave and/or laser beam). Upon encountering an object (e.g., a vehicle), the signal is reflected back to sensor(s) 102. The reflected signal may be used to determine the location of other vehicle(s) with respect to vehicle 100 and the speed, velocity, and/or direction in which the vehicle(s) are travelling, etc. The signal may be transmitted multiple times (including continuously) to detect changes in position, speed, velocity, and/or direction (e.g., to determine the rate of acceleration or deceleration of the other vehicle(s)). In an embodiment in which a radio wave is transmitted, characteristic determination logic 112 may be configured to measure the Doppler shift of the reflected wave to determine at location of the other vehicle (s) with respect to vehicle 100 and the speed, velocity, and/or direction in which the other vehicle(s) are travelling. In an embodiment in which a laser beam is transmitted, characteristic determination logic 112 may analyze the round-trip time for the laser beam to reach the object and to be reflected back to sensor(s) 102 and/or the angles at which the beam is transmitted and received to determine the location of the other vehicle(s) with respect to vehicle 100 and/or the speed, velocity, direction in which the other vehicle(s) are travelling. In lieu and/or in addition to using RADAR and/or LIDAR-based devices, the other vehicle(s) may transmit such characteristics to vehicle 100 via transceiver 108.

Processing unit(s) 104 may be further configured to refine the estimated mass or weight of the identified vehicle(s) based on a determined braking force of the vehicle(s) and a determined deceleration of the identified vehicle(s). The refined mass or weight may account for changes to the mass or weight of the identified vehicle(s) due to occupant(s) in the identified vehicle(s) or a load being hauled by such vehicle(s).

Collision determination logic 114 may be configured to determine that a collision is to occur between vehicle 100 and another vehicle based on the determined characteristics of the other vehicle. For example, collision determination logic 114 may determine the estimated velocity at which the other vehicle will collide with vehicle 100. The estimated velocity at the time of collision may be based on the initial speed measurement of the vehicle, the braking force of the vehicle, the distance between vehicle 100 and the other vehicle and the mass of the other vehicle. The velocity at impact may be calculated in accordance with Equation 1, which is shown below:

$$v_1 = \sqrt{v_0^2 - 2F \times d/m} \qquad \text{(Equation 1)}$$

where $v_0$ represents the initial speed measurement of the incoming vehicle, F represents the braking force of the incoming vehicle, d represents the distance between vehicle 100 and the incoming vehicle, m represents the mass of the incoming vehicle, and $v_1$ represents the estimated velocity at impact. It is noted that characteristic determination logic 112 may refine the braking force based on certain factors, such as the coefficient of friction of the road on which the vehicle(s) are traveling, the gradient of the road on which the vehicle(s) are travelling, the wind speed, etc.

If the estimated velocity at impact is greater than zero, collision determination logic 114 may determine that a collision is to occur (e.g., may determine that the maximum possible deceleration of the involved vehicles is not great enough to avoid contact between the vehicles). Upon collision determination logic 114 determining that a collision is to occur, action determination logic 116 may be configured to determine one or more evasive actions that vehicle 100 is to take to prevent the collision.

For example, based on the above-described sensor data, characteristic determination logic 112 may determine whether there is adequate space in front of vehicle 100 or to the sides of vehicle (e.g., to determine whether is any empty lane or shoulder). In response to determining that there is adequate space in front of vehicle 100, action determination logic 116 may cause vehicle 100 to accelerate to avoid the collision. For example, action determination logic 116 may provide one or more control signals to control component(s) 110. Examples of control component(s) 110, include but are not limited to, the acceleration system of the car, the braking system of the car, the steering system of the car, etc. Accordingly, action determination logic 116 may send control signal(s) to the acceleration system of vehicle 100 that cause vehicle 100 to accelerate. In response to determining that there is adequate space to one or more sides of vehicle, action determination logic 116 may send control signal(s) to the steering system and acceleration system of vehicle 104 that causes vehicle to steer into the empty lane or shoulder.

In certain situations, for example in a traffic jam or in a congested one-lane roadway, there may be no place for vehicle 100 to accelerate and/or steer to completely avoid a rear-end collision (i.e., the collision is inevitable). In such situations, action determination logic 116 may cause vehicle 100 to perform actions that reduce the change of momentum experienced by one or more occupants of vehicle 100 and/or other vehicles as a result of the collision, thereby reducing the acceleration or (g-forces) experienced by such occupant (s). Such actions may comprise accelerating into and causing a collision with the vehicle in front of vehicle 100 at or around the same time at which another vehicle rear-ends vehicle 100. Such a maneuver may reduce the difference in the velocities of the involved vehicles, thereby reducing the change in momentum occurring at the moment of collision. Momentum determination logic 118 may be configured to process several scenarios in real-time (taking into account changes of velocity of the vehicles involved) to determine the scenario that best mitigates the change of momentum. For example, momentum determination logic 118 may compare the change of momentum experienced by vehicle 100 as a result of accelerating at a first time before the estimated collision time versus a second time (and optionally additional times) before the estimated collision time and/or as a result of accelerating at a first rate versus a second rate (and optionally further rates).

Momentum determination logic 118 may determine the change of momentum based on the characteristics determined for the vehicles that are involved in the collision. For example, momentum determination logic 118 may calculate the momentum before impact for each vehicle to be involved in the impact in accordance with Equation 2, which is shown below:

$$p = m \times v\_before \qquad \text{(Equation 2)}$$

where p represents the momentum of a vehicle, m represents the mass of a vehicle, and v_before represents the velocity of a vehicle before impact. The mass m of each vehicle may be retrieved from memory 106 as described above. The velocity of vehicle 100 may be determined via communications with the speedometer of vehicle 100, and the velocity for other vehicles involved in the collision may be determined using the RADAR and/or LIDAR techniques described above. Because momentum is preserved on impact, the total momentum at impact is the sum of each individual vehicle momentum, which may be calculated in accordance with Equation 3, which is shown below:

$$\Sigma_{n=1}^{i} m_i \cdot v\_before_i \qquad \text{(Equation 3)}$$

where i represents the number of vehicles involved in the collision.

After impact, the total momentum is equal to the momentum before impact. Therefore, the velocity after impact may be calculated in accordance with Equation 4, which is shown below:

$$v\_after_i \cdot \Sigma_{n=1}^{i} m_i = \Sigma_{n=1}^{i}(m_i \cdot v\_before_i) \quad \text{(Equation 4)}$$

where v_after represents the velocity of a vehicle after impact.

Using the determined mass and the determined before and after impact velocities, processing unit(s) 104 may estimate how much energy is absorbed by the crumple zones of the vehicles. For example, each vehicle has kinetic energy before impact, which may be calculated in accordance with Equation 5, which is shown below:

$$E_{kb} = \tfrac{1}{2} \cdot m \cdot v\_before^2 \quad \text{(Equation 5)}$$

where $E_{kb}$ represents the kinetic energy for a vehicle before impact.

The energy transferred to the crumple zone(s) (or other deformations) of the involved vehicle(s) is the sum of all kinetic energy before impact, minus the energy after impact. This is reflected in Equation 6, which is shown below:

$$E_t = \Sigma_{n=1}^{i} E_{kb} - \Sigma_{n=1}^{i} E_{ka} \quad \text{(Equation 6)}$$

where $E_{ka}$ represents the kinetic energy for a vehicle after impact, and $E_t$ represents the transferred energy, which may be used to estimate the crumple zone. Based on the mass estimates for each vehicle involved in the collision, processing unit(s) 104 may be configured to estimate how the energy is distributed between the vehicles involved in the collision. As described above, memory 106 may store how much energy is absorbed by the crumple zone of vehicle 100 for different types of impact. Momentum determination logic 118 may calculate the acceleration or (g-forces) experienced by the occupant(s) of the vehicle(s) involved with the collision and the length of time for which the acceleration is experienced based on the calculated velocities before and after impact in accordance with Equation 7, which is shown below:

$$a = \frac{\Delta v}{\Delta t} \quad \text{(Equation 7)}$$

where Δv is the velocity change vector of a vehicle and Δt is time interval of the acceleration for the vehicle.

After momentum determination logic 118 determines the change of momentum experienced by occupant(s) of the vehicle(s) for different sets of actions, action determination logic 116 may determine the set of action(s) that best reduces the change of momentum experienced by the occupant(s) of the vehicle(s).

Figure 2:
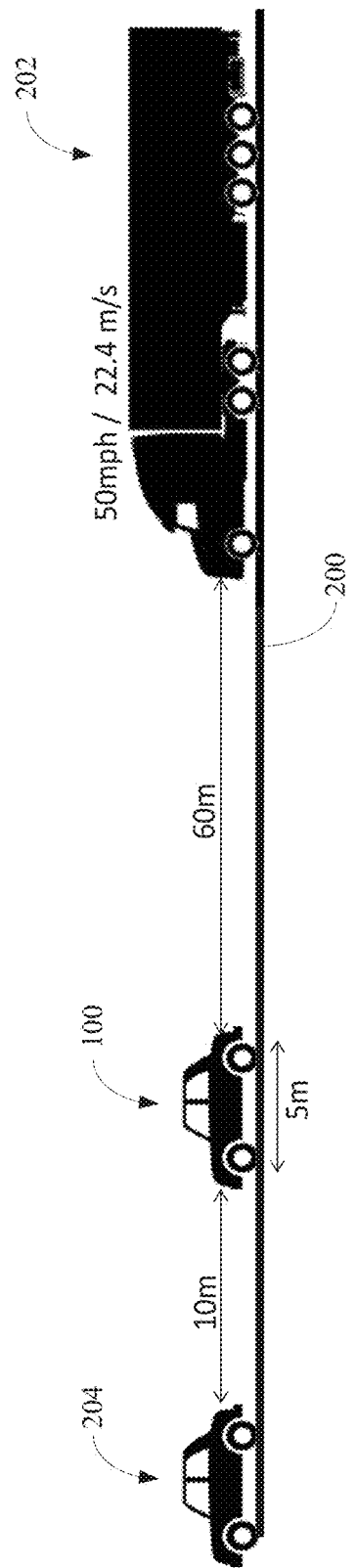
FIG. 2 depicts a roadway with a vehicle, a truck and a car in accordance with an embodiment.

The following is an example of vehicle 100 performing actions in response to processing unit(s) 104 determining that a collision is to occur. The example will be described with reference to FIG. 2. FIG. 2 depicts a roadway 200 with vehicle 100, a truck 202 and a car 204 in accordance with an embodiment. Based on image and/or video data collected by sensor(s) 102, characteristic determination logic 112 determines that truck 202 is behind vehicle 100 and car 204 is in front of vehicle 100. Based on sensor data collected from RADAR and/or LIDAR-based sensors of sensor(s) 102, characteristic determination logic 112 determines that truck 204 is travelling at 50 miles per hour (or 22.4 meters/second) and is 60 meters behind vehicle 100, and determines that vehicle 202 is 10 meters in front of vehicle 100. In accordance with Equation 1, characteristic determination logic 112 determines that the estimated velocity at impact (assuming a braking force of 90000 Joules and the mass of truck 204 being 36000 kg) to be 30 miles per hour (or 13.5 meters/second). Because the estimated velocity at impact is greater than zero, collision determination logic 114 determines that a collision is to occur between truck 204 and vehicle 100. Moreover, action determination logic 116 may determine that 10 meters is not enough space for vehicle 100 to accelerate to completely avoid the collision. As a result, action determination logic 116 determines actions to perform that reduce the change of momentum experienced by one or more occupants of vehicle 100, truck 202 and/or car 204 as a result of the inevitable collision.

Momentum determination logic 118 may simulate multiple scenarios to determine the scenario that best mitigates the change of momentum. In the example shown in FIG. 2, action determination logic 116 may determine that the best scenario is for vehicle 100 to rear-end car 202 just before or at the same time as truck 202 collides with vehicle 100. Accordingly, the action to be taken by vehicle 100 to accomplish this is to accelerate at a specific time. The start time of acceleration in this scenario, may be determined in accordance with Equation 8, which is shown below:

$$t = \text{sqrt}(2*d/a) \quad \text{(Equation 8)}$$

where d represents the distance between vehicle 100 and vehicle 202 (e.g., 10 meters), and a is the initial acceleration capabilities of vehicle 100. The initial acceleration may be a characteristic stored in memory 106. In an example where the initial acceleration of vehicle 100 is 4.5 meters/second², action determination logic 116 determines the start time of acceleration to be 2.1 seconds before truck 202 collides with vehicle 100, thereby resulting in the velocity of vehicle 100 being 9.45 meters/second (or 21 miles per hour) at the time of impact.

The momentum after impact may be determined in accordance with Equation 9, which is shown below:

$$m_t * v_1 + m_1 * v_2 = (m_t + m_1 + m_2) * v_3 \quad \text{(Equation 9)}$$

where $m_t$ is the mass of truck 202, $m_1$ is the mass of vehicle 100, $m_2$ is the mass of car 204, $v_1$ is the velocity of truck 202 at impact, $v_2$ is the velocity of vehicle 100, and $v_3$ is the velocity of truck 202, vehicle 100, and car 204 after impact. In the example shown in FIG. 2, $v_1$ may be solved in accordance with Equation 1, thereby resulting in a velocity of 12.3 meters/second. $v_2$ may be determined based on the initial acceleration of 4.5 meters/seconds², as described above. Solving for $v_3$ yields a velocity of 11.7 meters/second.

The acceleration (or g-force) experienced by the occupants of vehicle 100 depends on how the crumple zone(s) on each of vehicle 100, truck 202, and car 204 compress (i.e., absorb energy). Assuming a 4-foot crumple zone (approximately a 1-foot crumple zone between truck 202 and vehicle 100 and approximately a 3-foot crumple zone between vehicle 100 and car 204), the acceleration experienced by the occupant(s) of vehicle 100 is 11.22 meter/second², which is approximately 1.1 g's of impact for 198 milliseconds. Car 202 receives a bigger impact. For instance, the acceleration experienced by the occupant(s) of car 204 is 58.7 meters/second² (or approximately 6 g's) for 198 milliseconds.

In a scenario in which no mitigation is performed (i.e., vehicle 100 does not accelerate into car 204 and instead sits idle), the occupant(s) of vehicle 100 would experience an acceleration of 156.90 meters/second² (or approximately 16 g's) of impact for an 87 millisecond duration, which is a significantly larger amount of g-forces acting upon the occupant(s).

Figure 3:
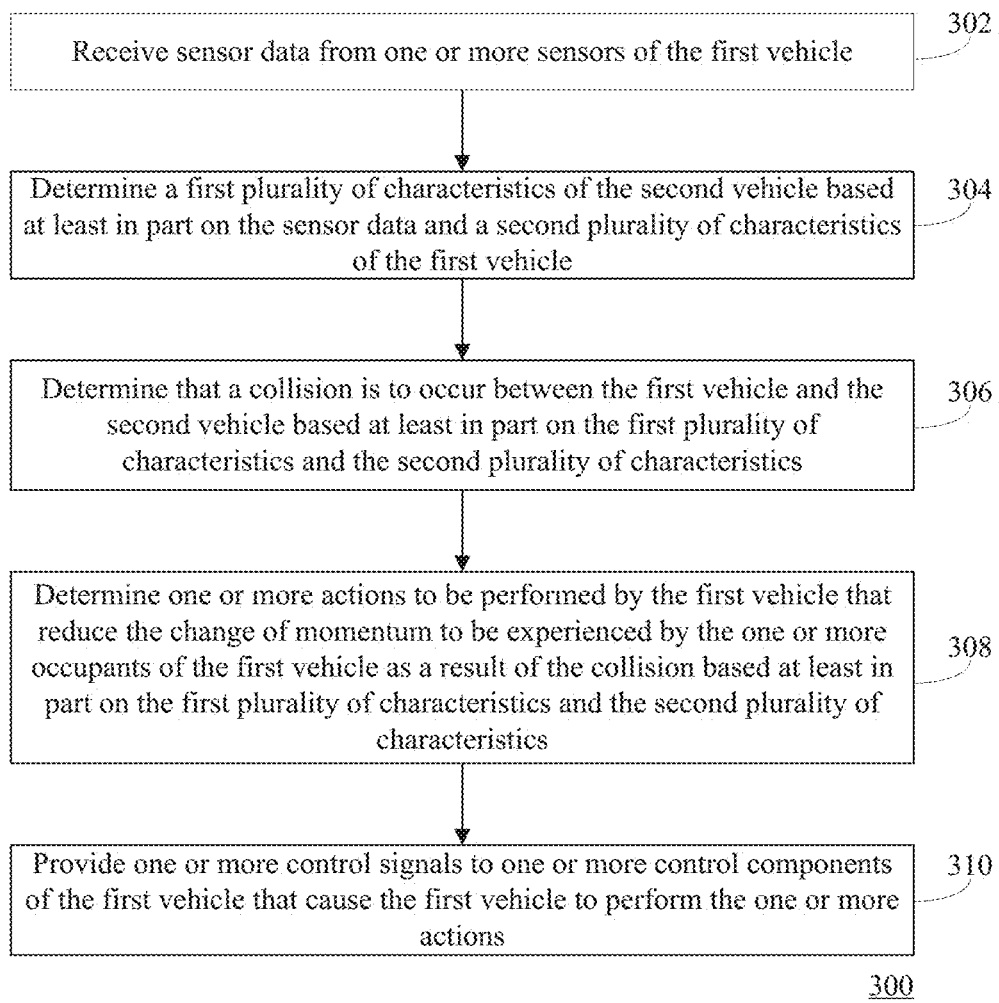
FIG. 3 shows a flowchart of a method for reducing a change of momentum to be experienced by occupant(s) of a vehicle during a collision with another vehicle in accordance with an embodiment.
Figure 4:
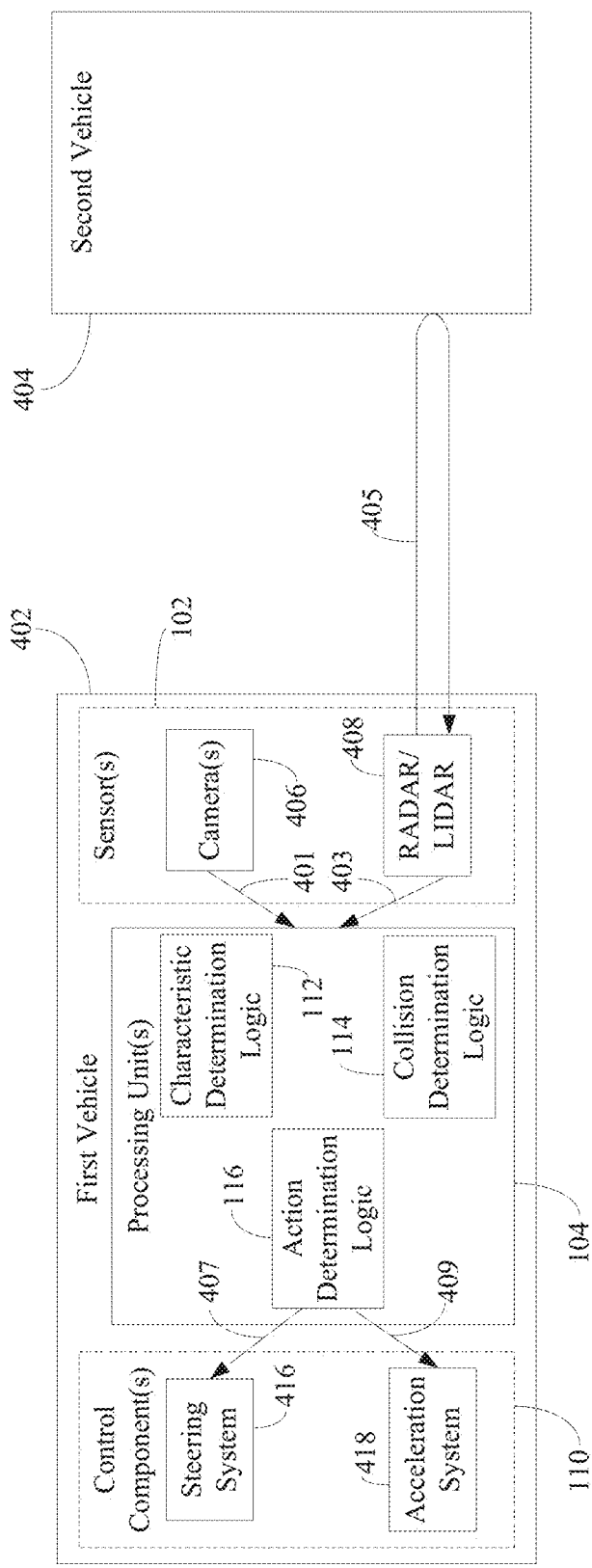
FIG. 4 is a block diagram of a first vehicle sensing and attempting to mitigate a collision with a second vehicle in accordance with an example embodiment.

Accordingly, a change of momentum to be experienced by occupant(s) of a vehicle may be reduced during a collision with another vehicle, according to embodiments. For example, FIG. 3 shows a flowchart 300 of a method for reducing a change of momentum to be experienced by occupant(s) of a vehicle during a collision with another vehicle, according to an example embodiment. In an embodiment, flowchart 300 may be implemented by first vehicle 402, as shown in FIG. 4. FIG. 4 is a block diagram of first vehicle 402 and second vehicle 404 in accordance with an example embodiment. First vehicle 402 is an example of vehicle 100, as described above with reference to FIGS. 1 and 2. Accordingly, first vehicle 402 comprises sensor(s) 102, processing unit(s) 104, and control component(s) 110. Processing unit(s) 104 comprise characteristic determination logic 112, collision determination logic 114, and action determination logic 116. Other structural and operational embodiments will be apparent to persons skilled in the relevant art(s) based on the following discussion regarding flowchart 300 and system 400 of FIG. 4.

Flowchart 300 begins with step 302. In step 302, sensor data is received from one or more sensors of the first vehicle. For example, with reference to FIG. 4, processing unit(s) 104 receive sensor data 401 and 403 from sensor(s) 102.

In accordance with one or more embodiments, sensor(s) 102 comprise one or more cameras 406 and one or more RADAR and/or LIDAR-based devices 408. In accordance with such an embodiment, sensor data 401 comprises image and/or video data obtained by camera(s), and sensor data 403 comprises data associated with a signal transmitted by RADAR and/or LIDAR-based device(s) 408 and reflected back thereto.

In step 304, a first plurality of characteristics of the second vehicle are determined based at least in part on the sensor data and a second plurality of characteristics of the first vehicle are determined. For example, with reference to FIG. 4, characteristic determination logic 112 determines the first plurality of characteristics and the second plurality of characteristics.

In accordance with one or more embodiment, the first plurality of characteristics comprise at least one of an estimated velocity of the second vehicle, a direction from which the second vehicle is approaching the first vehicle, a mass of the second vehicle, a braking force associated with the second vehicle, an estimate of velocity of the second vehicle at a time of impact between the second vehicle and the first vehicle, and/or an estimate of energy absorbed at the time of impact by one or more determined crumple zones of the second vehicle. With reference to FIG. 4, characteristic determination logic 112 may determine an estimated velocity of second vehicle 404 and direction from which second vehicle 404 is approaching based on sensor data 403. For example, RADAR/LIDAR based devices 408 may transmit a signal 405 (e.g., a radio wave or a laser beam) that reflects off second vehicle 404 and is detected by RADAR/LIDAR based-device(s) 408. In an embodiment in which a radio wave is transmitted, characteristic determination logic 112 may be configured to measure the Doppler shift of the reflected wave to determine at least the relative velocity of second vehicle 404. In an embodiment in which a laser beam is transmitted, the round-trip time for the laser beam to reach the object and be reflected back to RADAR/LIDAR based-device(s) 408 and/or the angles at which the beam is transmitted and received may be used by characteristic determination logic 112 to determine the direction from which second vehicle 404 is approaching first vehicle 402 and the velocity of second vehicle 404. Characteristic determination logic 112 may determine the mass of the second vehicle, the braking force associated with the second vehicle, and the estimate of energy absorbed at the time of impact by one or more determined crumple zones of second vehicle based on sensor data 401. For example, characteristic determination logic 112 may perform an image and/or video recognition process to determine the type, make and/or model of second vehicle and access a database (e.g., stored in memory 106, as shown in FIG. 1) that stores characteristics, such as the mass of second vehicle and the estimate of energy absorbed at the time of impact by determined crumple zones of second vehicle 404. Characteristic determination logic 112 may be configured to determine the velocity of second vehicle 404 at a time of collision between the second vehicle 404 and the first vehicle 402 using one or more of the above-described characteristics in accordance with Equation 1, as described above.

In accordance with one or more embodiment, the second characteristics comprise at least one of a mass of the first vehicle, braking capabilities of the first vehicle, acceleration capabilities of the first vehicle, steering capabilities of the first vehicle, or an estimate of energy absorbed at the time of impact by one or more crumple zones of the first vehicle. The foregoing characteristics may be stored and retrieved from memory 106, as shown in FIG. 1.

In step 306, a determination is made that a collision is to occur between the first vehicle and the second vehicle based at least in part on the first plurality of characteristics and the second plurality of characteristics. For example, as shown in FIG. 4, collision determination logic 114 may determine that a collision is to occur if the estimated velocity of second vehicle 404 at the time of collision between second vehicle 404 and first vehicle 402 is greater than zero.

In step 308, one or more actions to be performed are determined by the first vehicle that reduce the change of momentum to be experienced by the occupant(s) of the first vehicle as a result of the collision based at least in part on the first plurality of characteristics and the second plurality of characteristics. For example, as shown in FIG. 4, action determination logic 116 may determine the one or more actions to be performed.

In step 310, one or more control signals are provided to one or more control components of the first vehicle that cause the first vehicle to perform the one or more actions. For example, with reference to FIG. 4, action determination logic 116 provides control signal(s) 407 and 409 to control component(s) 110 that cause first vehicle 402 to perform the one or more actions.

In accordance with one or more embodiments, the one or more control components comprise an acceleration system 418 and a steering system 416. In accordance with such embodiment(s), first signal 407 may cause the first vehicle 402 to accelerate at a first predetermined time and/or second signal 409 causes first vehicle 402 to steer in a predetermined direction at a second predetermined time.

In accordance with one or more embodiments, determining the one or more actions may comprise determining that the second vehicle is to collide with first vehicle at the rear of the first vehicle, determining that a third vehicle is in front of the first vehicle, determining a third plurality of characteristics of the third vehicle, and determining the one or more actions to be performed by the first vehicle that reduces the change of momentum to be experienced by the one or more occupants of the first vehicle as a result of the collision based at least in part on the first plurality of characteristics, the second plurality of characteristics, and the third plurality of characteristics. For example, with reference to FIG. 4, characteristic determination logic 112 may determine that second vehicle 402 is to collide with first vehicle 402 at the rear of first vehicle 404 and determine that a third vehicle (not shown) is in front of first vehicle 402 based on an image and/or video recognition process performed on sensor data 401 received from camera(s) 406. The third plurality of characteristic(s) of the third vehicle may also be determined based on sensor data 401 received from camera(s) 406 and/or sensor data 403 received from RADAR/LIDAR-based devices 408 in a similar manner as described above with respect to the characteristic(s) determined for second vehicle 404.

In accordance with one or more embodiments, the third characteristics of the third vehicle comprise an estimated velocity of the third vehicle, a mass of the third vehicle, or an estimate of energy absorbed at the time of impact by one or more determined crumple zones of the third vehicle.

In accordance with one or more embodiments, the one or more control signals comprise one or more of a first control signal to an acceleration system of the first vehicle that causes the first vehicle to accelerate and collide with the third vehicle at a first predetermined time or a second control signal to a steering system of the first vehicle that causes the first vehicle to steer into the third vehicle at a second predetermined time. For example, with reference to FIG. 4, control signal 409 may cause acceleration system 418 to accelerate first vehicle 402 and collide with the third vehicle at a first predetermined time and control signal 407 may cause the steering system 416 to steer first vehicle 402 into the third vehicle at a second predetermined time.

Figure 5:
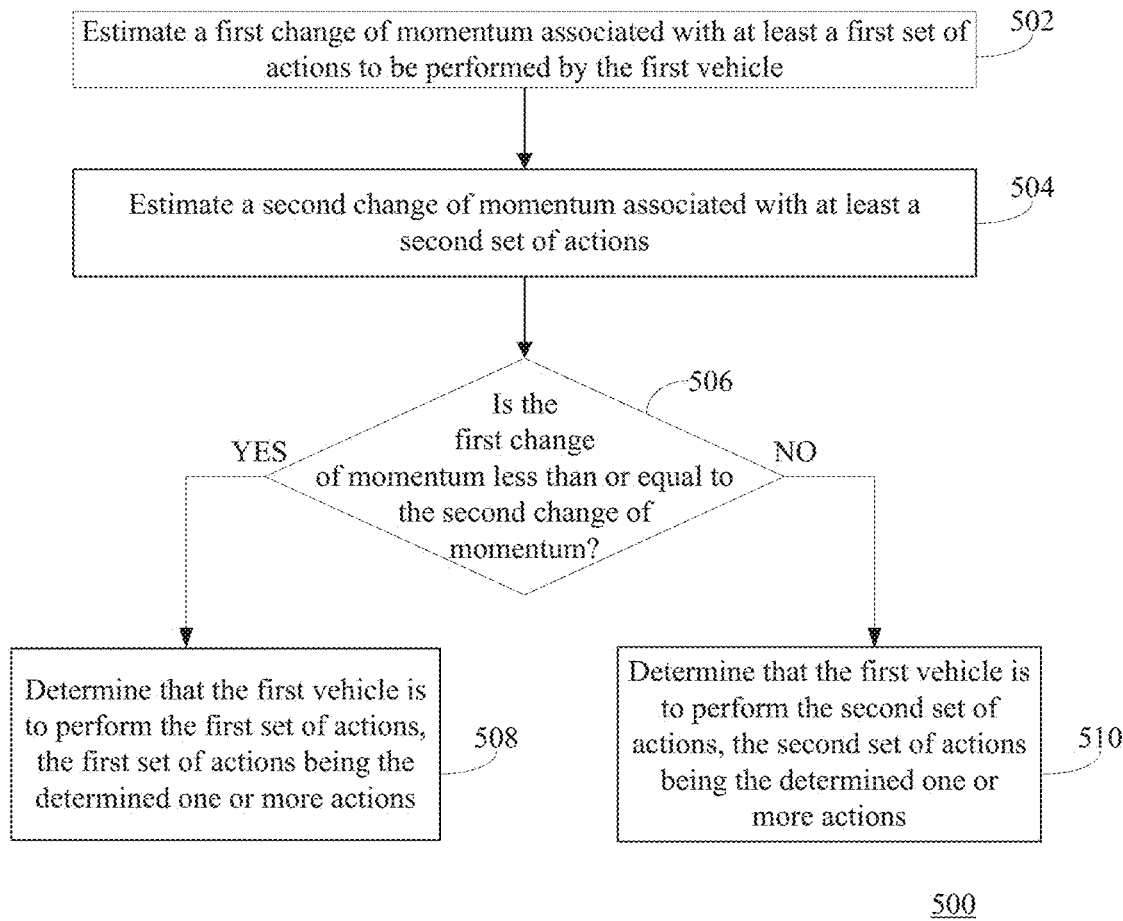
FIG. 5 shows a flowchart of a method for selecting one or more actions to be performed by a vehicle to best mitigate a change of momentum experienced by one or more occupants of the vehicle in accordance with an example embodiment.
Figure 6:
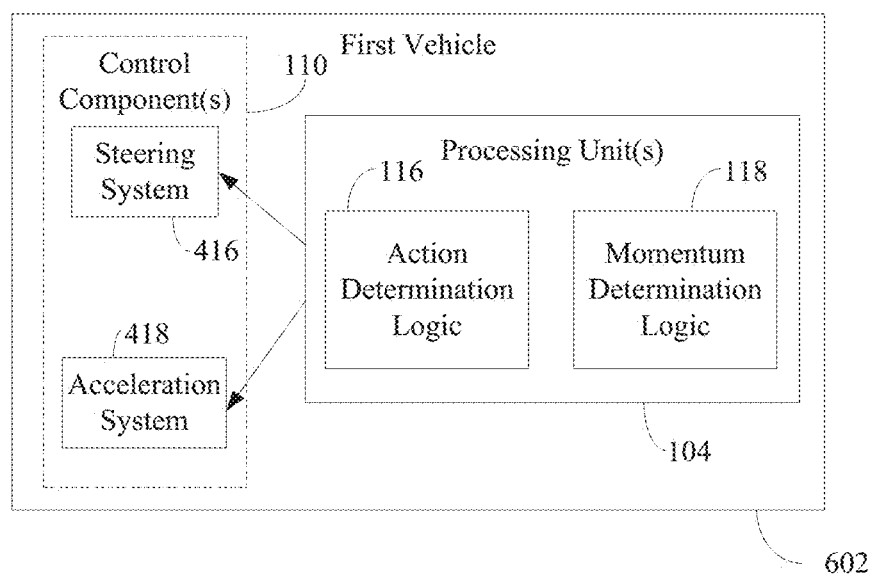
FIG. 6 is a block diagram of a first vehicle containing one or more processing units and control components for accident momentum change reduction, in accordance with an example embodiment.

In accordance with one or more embodiments, the determined action(s) may be selected from a plurality of a different set of actions analyzed by processing unit(s) 104, where each set of actions results in a different change of momentum experienced by occupant(s) of first vehicle 402. The selected action(s) may best mitigate the change of momentum experienced by the occupant(s). For example, FIG. 5 shows a flowchart 500 of a method for selecting action(s) to be performed by a vehicle that best mitigate the change of momentum experienced by occupant(s) of the vehicle in accordance with an example embodiment. In an embodiment, flowchart 500 may be implemented by first vehicle 402, as shown in FIG. 6. FIG. 6 is a block diagram of a first vehicle 602 in accordance with an example embodiment. First vehicle 602 is an example of vehicle 402, as described above with reference to FIG. 4. As shown in FIG. 6, first vehicle 602 comprises, processing unit(s) 104, and control component(s) 110, processing unit(s) 104 include action determination logic 116 and momentum determination logic 118, and control component(s) 110 include steering system 416 and acceleration system 418. Other structural and operational embodiments will be apparent to persons skilled in the relevant art(s) based on the following discussion regarding flowchart 500 and first vehicle 602 of FIG. 6.

Flowchart 500 begins with step 502. In step 502, a first change of momentum associated with at least a first set of actions to be performed by the first vehicle are estimated. For example, with reference to FIG. 6, momentum determination logic 118 may estimate a first change of momentum with at least a first set of actions to be performed by the first vehicle. For instance, the first set of actions may comprise causing first vehicle 602 accelerate at a first time before an estimated time at which another vehicle will rear-end first vehicle 602.

At step 504, a second change of momentum associated with at least a second set of actions to be performed by the first vehicle are estimated. For example, with reference to FIG. 6, momentum determination logic 118 may estimate a second change of momentum with at least a second set of actions to be performed by the first vehicle. For instance, the second set of actions may comprise causing first vehicle 602 accelerate at a second time (that is different than the first time described above with reference to step 502) before an estimated time at which another vehicle will rear-end first vehicle 602.

At step 506, a determination is made as to whether the first change of momentum is less than or equal to the second change of momentum. For example, with reference to FIG. 6, action determination logic 116 may determine whether the first change of momentum is less than or equal to the second change of momentum. If a determination is made that the first change of momentum is less than or equal to the second change of momentum, flow continues to step 508. Otherwise, flow continues to step 510.

At step 508, a determination is made that the first vehicle is to perform the first set of actions, the first set of actions being the determined action of step 310 described above with reference to FIG. 3. For example, with reference to FIG. 6, action determination logic 116 may determine that the first vehicle is to perform the first set of actions.

At step 510, a determination is made that the first vehicle is to perform the second set of actions, the second set of actions being the determined action of step 310 described above with reference to FIG. 3. For example, with reference to FIG. 6, action determination logic 116 may determine that the first vehicle is to perform the second set of actions.

As described above, the embodiments described herein reduce the bodily injury of occupant(s) of a vehicle as a result of a collision via an automated process that determines an optimal set of automated evasive actions to be performed by the vehicle. The optimal set of automated evasive actions best mitigate the change of momentum experienced by the occupant(s), thereby reducing the acceleration (or g-forces) experienced by such occupant(s). The determined evasive actions are determined and performed with speed and precision that is not attainable by human drivers.

It is noted that while the foregoing embodiments and examples describe the determination of evasive action(s) that can be taken when a collision is to occur between two or three vehicles, evasive action(s) may be determined for various types of collision involving any number of vehicle (s).

It is noted that sensor(s) 102, processing unit(s) 104, memory 16, transceiver 108, characteristic determination logic 112, collision determination logic 114, action determination logic 116, momentum determination logic 118, camera(s) 406, RADAR/LIDAR-based device(s) 408 (as described above with reference to FIGS. 1, 4, and 6) may be integrated with vehicle 100 (and/or the computer system of vehicle 100).

Alternatively, sensor(s) 102, processing unit(s) 104, memory 16, transceiver 108, characteristic determination logic 112, collision determination logic 114, action determination logic 116, momentum determination logic 118, camera(s) 406, RADAR/LIDAR-based device(s) 408, flowchart 300 and/or flowchart 500 may be included in and/or implemented by a mobile device that communicates with control component(s) 110 of vehicle 100 to perform the determined set of evasive actions. Examples of such a mobile device are described below with reference to FIG. 7.

III. Example Mobile and Stationary Device Embodiments

Sensor(s) 102, processing unit(s) 104, memory 16, transceiver 108, characteristic determination logic 112, collision determination logic 114, action determination logic 116, momentum determination logic 118, camera(s) 406, RADAR/LIDAR-based device(s) 408, flowchart 300 and/or flowchart 500, may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
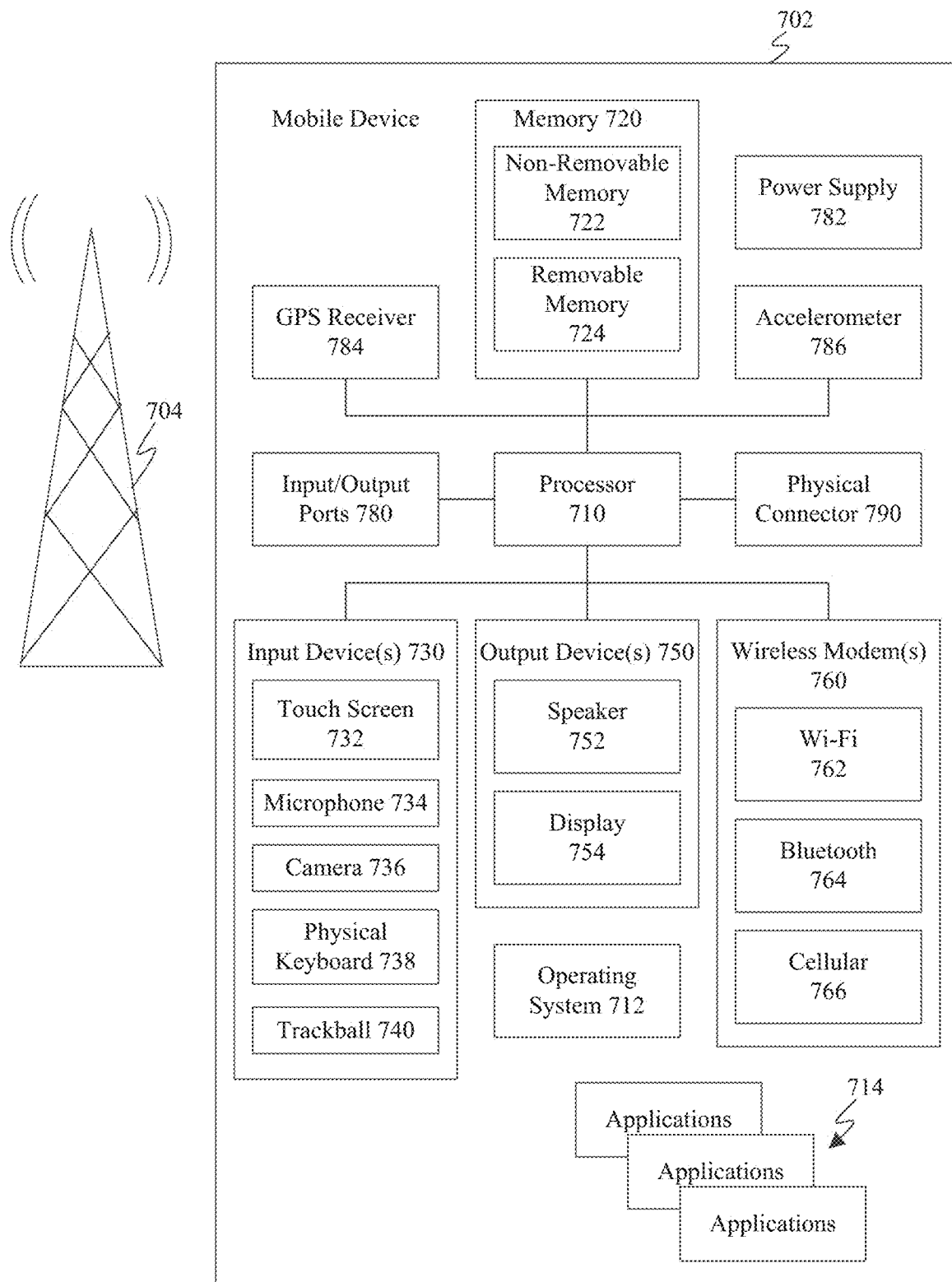
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of components 702 may be included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data Examples of such application programs or program modules may include, for example, computer program logic (e.g., computer program code or instructions) for implementing sensor(s) 102, processing unit(s) 104, memory 16, transceiver 108, characteristic determination logic 112, collision determination logic 114, action determination logic 116, momentum determination logic 118, camera(s) 406, RADAR/LIDAR-based device(s) 408, flowchart 300 and/or flowchart 500.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
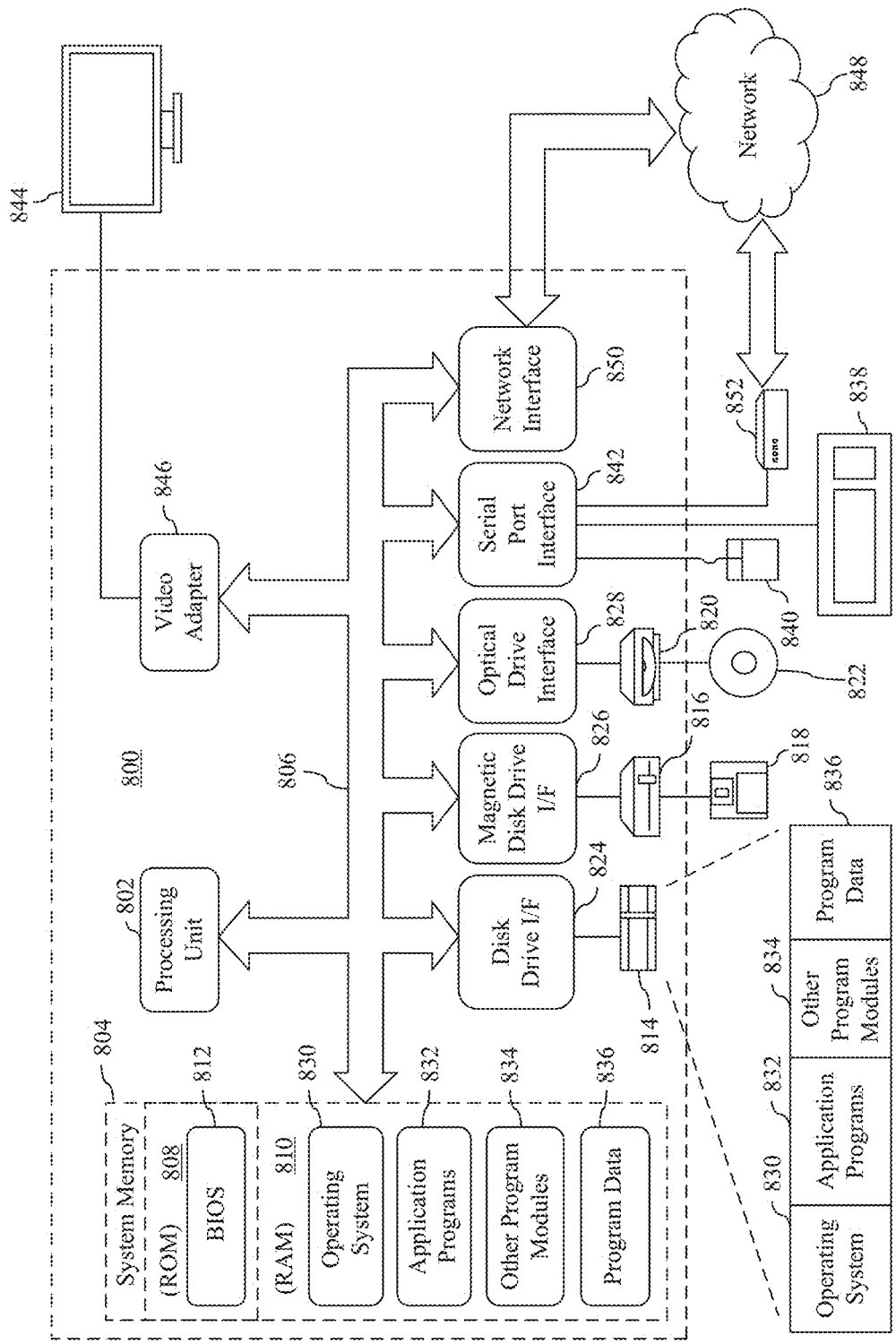
FIG. 8 is a block diagram of an example computing device that may be used to implement embodiments.

Furthermore, FIG. 8 depicts an exemplary implementation of a computing device 800 in which embodiments may be implemented. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a disk drive 814 for reading from and writing to a disk (e.g., a hard disk drive or a solid state drive), a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a disk drive interface 824 (e.g., a hard disk drive interface or a solid state drive interface), a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing sensor(s) 102, processing unit(s) 104, memory 16, transceiver 108, characteristic determination logic 112, collision determination logic 114, action determination logic 116, momentum determination logic 118, camera(s) 406, RADAR/LIDAR-based device(s) 408, flowchart 300 and/or flowchart 500 ery action initiator 710, nodes 708A, 708B, and 708N, flowchart 300, and/or flowchart 600.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method for reducing a change of momentum to be experienced by one or more occupants of a first vehicle during a collision with a second vehicle is described herein. The method includes: receiving sensor data from one or more sensors of the first vehicle; determining a first plurality of characteristics of the second vehicle based at least in part on the sensor data and a second plurality of characteristics of the first vehicle; determining that a collision is to occur between the first vehicle and the second vehicle based at least in part on the first plurality of characteristics and the second plurality of characteristics; determining one or more actions to be performed by the first vehicle that reduce the change of momentum to be experienced by the one or more occupants of the first vehicle as a result of the collision based at least in part on the first plurality of characteristics and the second plurality of characteristics; and providing one or more control signals to one or more control components of the first vehicle that cause the first vehicle to perform the one or more actions.

In one embodiment of the foregoing method, the one or more sensors comprise at least one or more cameras and one or more of a RADAR-based device, a LIDAR-based device, or a proximity sensor.

In another embodiment of the foregoing method, the first plurality of characteristics comprises at least one of: an estimated velocity of the second vehicle before the collision; a direction from which the second vehicle is approaching the first vehicle; a mass of the second vehicle; a braking force associated with the second vehicle; an estimate of velocity of the second vehicle at a time of collision between the second vehicle and the first vehicle; or an estimate of energy absorbed at the time of impact by one or more determined crumple zones of the second vehicle.

In a further embodiment of the foregoing method, the second plurality of characteristics comprise at least one of: a mass of the first vehicle; braking capabilities of the first vehicle; acceleration capabilities of the first vehicle; steering capabilities of the first vehicle; or an estimate of energy absorbed at the time of impact by one or more crumple zones of the first vehicle.

In yet another embodiment of the foregoing method, said determining the one or more actions comprises: estimating a first change of momentum associated with at least a first set of actions to be performed by the first vehicle; and estimating a second change of momentum associated with at least a second set of actions; determining whether the first change of momentum is less than or equal to the second change of momentum; in response to determining that the first change of momentum is less than or equal to the second change of momentum, determining that the first vehicle is to perform the first set of actions, the first set of actions being the determined one or more actions; and in response to determining that the first change of momentum is greater than the second change of momentum, determining that the first vehicle is to perform the second set of actions, the second set of actions being the determined one or more actions.

In still another embodiment of the foregoing method, the one or more control components comprises an acceleration system of the first vehicle and a steering system of the first vehicle, and the one or more control signals comprise one or more of: a first control signal to the acceleration system of the first vehicle that causes the first vehicle to accelerate at a first predetermined time; or a second control to the steering system of the first vehicle that causes the first vehicle to steer in a predetermined direction at a second predetermined time.

In another embodiment of the foregoing method, said determining the one or more actions comprises: determining that the second vehicle is to collide with first vehicle at the rear of the first vehicle; determining that a third vehicle is in front of the first vehicle; determining a third plurality of characteristics of the third vehicle; and determining the one or more actions to be performed by the first vehicle that reduces the change of momentum to be experienced by the one or more occupants of the first vehicle as a result of the collision based at least in part on the first plurality of characteristics, the second plurality of characteristics, and the third plurality of characteristics.

In yet another embodiment of the foregoing method, the third plurality of characteristics comprises at least one of: an estimated velocity of the third vehicle; a mass of the third vehicle; or an estimate of energy absorbed at the time of impact by one or more determined crumple zones of the third vehicle.

In a further embodiment of the foregoing method, the one or more control signals comprise one or more of: a first control signal to an acceleration system of the first vehicle that causes the first vehicle to accelerate and collide with the third vehicle at a first predetermined time; or a second control signal to a steering system of the first vehicle that causes the first vehicle to steer into the third vehicle at a second predetermined time.

A system in a first vehicle is described. The system comprises: one or more sensors; one or more processing units communicatively coupled to the one or more sensors; and one or more control components communicatively coupled to the one or more processing units, the one or more processing units configured to: receive sensor data from the one or more sensors of the first vehicle; determine a first plurality of characteristics of a second vehicle based at least in part on the sensor data and a second plurality of characteristics of the first vehicle; determine that a collision is to occur between the first vehicle and the second vehicle based at least in part on the first plurality of characteristics and the second plurality of characteristics; determine one or more actions to be performed by the first vehicle that reduces a change of momentum to be experienced by one or more occupants of the first vehicle as a result of the collision based at least in part on the first plurality of characteristics and the second plurality of characteristics; and provide one or more control signals to the one or more control components of the first vehicle that cause the first vehicle to perform the one or more actions.

In one embodiment of the foregoing system, the one or more sensors comprise at least one or more cameras and one or more of a RADAR-based device or a LIDAR-based device.

In another embodiment of the foregoing system, the first plurality of characteristics comprises at least one of: an estimated velocity of the second vehicle before the collision: a direction from which the second vehicle is approaching the first vehicle; a mass of the second vehicle; a braking force associated with the second vehicle; an estimate of velocity of the second vehicle at a time of collision between the second vehicle and the first vehicle; or an estimate of energy absorbed at the time of impact by one or more determined crumple zones of the second vehicle.

In yet another embodiment of the foregoing system, the second plurality of characteristics comprise at least one of: a mass of the first vehicle; braking capabilities of the first vehicle; acceleration capabilities of the first vehicle; steering capabilities of the first vehicle; or an estimate of energy absorbed at the time of impact by one or more crumple zones of the first vehicle.

In still another embodiment of the foregoing system, to determine the one or more actions, the one or more processing units are configured to: estimate a first change of momentum associated with at least a first set of actions to be performed by the first vehicle; estimate a second change of momentum associated with at least a second set of actions;

determine whether the first change of momentum is less than or equal to the second change of momentum; in response to the first change of momentum being determined to be less than or equal to the second change of momentum, determine that the first vehicle is to perform the first set of actions, the first set of actions being the determined one or more actions; and in response to the first change of momentum being determined to be greater than the second change of momentum, determine that the first vehicle is to perform the second set of actions, the second set of actions being the determined one or more actions.

In yet another embodiment of the foregoing system, the one or more control signals comprise one or more of: a first control signal to an acceleration system of the first vehicle that causes the first vehicle to accelerate at a first predetermined time; or a second control to a steering system of the first vehicle that causes the first vehicle to steer in a predetermined direction at a second predetermined time.

In still another embodiment of the foregoing system, to determine the one or more actions, the one or more processing units are configured to: determine that the second vehicle is to collide with first vehicle at the rear of the first vehicle; determine that a third vehicle is in front of the first vehicle; determine a third plurality of characteristics of the third vehicle; and determine the one or more actions to be performed by the first vehicle that reduces the change of momentum to be experienced by the one or more occupants of the first vehicle as a result of the collision based at least in part on the first plurality of characteristics, the second plurality of characteristics, and the third plurality of characteristics.

In a further embodiment of the foregoing system, the third plurality of characteristics comprises at least one of: an estimated velocity of the third vehicle; a mass of the third vehicle; or an estimate of energy absorbed at the time of impact by one or more determined crumple zones of the third vehicle.

In still another embodiment of the foregoing system, the one or more control components comprises an acceleration system of the first vehicle and a steering system of the first vehicle, and wherein the one or more control signals comprise one or more of: a first control signal to the acceleration system of the first vehicle that causes the first vehicle to accelerate and collide with the third vehicle at a first predetermined time; or a second control signal to the steering system of the first vehicle that causes the first vehicle to steer into the third vehicle at a second predetermined time.

A computer-readable storage medium having program instructions recorded thereon that, when executed by at least one processing circuit, perform a method for reducing a change of momentum to be experienced by one or more occupants of a first vehicle during a collision with a second vehicle, the method comprising: receiving sensor data from one or more sensors of the first vehicle; determining a first plurality of characteristics of the second vehicle based at least in part on the sensor data and a second plurality of characteristics of the first vehicle; determining that a collision is to occur between the first vehicle and the second vehicle based at least in part on the first plurality of characteristics and the second plurality of characteristics; determining one or more actions to be performed by the first vehicle that reduces the change of momentum to be experienced by the one or more occupants of the first vehicle as a result of the collision based at least in part on the first plurality of characteristics and the second plurality of characteristics; and providing one or more control signals to one or more control components of the first vehicle that cause the first vehicle to perform the one or more actions.

In one embodiment of the foregoing computer-readable storage medium, the one or more sensors comprise at least one or more cameras and one or more of a RADAR-based device or a LIDAR-based device.

V. CONCLUSION

While various embodiments have been described above, it should be understood that they have been presented by way of example only, and not limitation. It will be understood by those skilled in the relevant art(s) that various changes in form and details may be made therein without departing from the spirit and scope of the embodiments. Accordingly, the breadth and scope of the embodiments should not be limited by any of the above-described exemplary embodiments, but should be defined only in accordance with the following claims and their equivalents.

What is claimed is:

1. A method for reducing a change of momentum to be experienced by one or more occupants of a first vehicle during a collision with a second vehicle, comprising:
   receiving sensor data from one or more sensors of the first vehicle;
   determining a first plurality of characteristics of the second vehicle based at least in part on the sensor data and a second plurality of characteristics of the first vehicle;
   determining that a collision is to occur between the first vehicle and the second vehicle based at least in part on the first plurality of characteristics and the second plurality of characteristics;
   determining a start time at which the first vehicle is to be accelerated based on a distance between the first vehicle and the second vehicle and initial acceleration capabilities of the first vehicle;
   determining one or more actions to be performed by the first vehicle that reduce the change of momentum to be experienced by the one or more occupants of the first vehicle as a result of the collision based at least in part on the first plurality of characteristics and the second plurality of characteristics; and
   providing one or more control signals to one or more control components of the first vehicle that cause the first vehicle to perform the one or more actions, the one or more control components comprising an acceleration system of the first vehicle, the one or more control signals comprising a first control signal to the acceleration system that causes the first vehicle to accelerate at the start time.

2. The method of claim 1, wherein the one or more sensors comprise at least one or more cameras and one or more of a RADAR-based device, a LIDAR-based device, or a proximity sensor.

3. The method of claim 1, wherein the first plurality of characteristics comprises at least one of:
   an estimated velocity of the second vehicle before the collision;
   a direction from which the second vehicle is approaching the first vehicle;
   a mass of the second vehicle;
   a braking force associated with the second vehicle;
   an estimate of velocity of the second vehicle at a time of collision between the second vehicle and the first vehicle; or an estimate of energy absorbed at the time of impact by one or more determined crumple zones of the second vehicle.

4. The method of claim 1, wherein the second plurality of characteristics comprise at least one of:
a mass of the first vehicle;
braking capabilities of the first vehicle;
the initial acceleration capabilities of the first vehicle;
steering capabilities of the first vehicle; or
an estimate of energy absorbed at the time of impact by one or more crumple zones of the first vehicle.

5. The method of claim 1, wherein said determining the one or more actions comprises:
estimating a first change of momentum associated with at least a first set of actions to be performed by the first vehicle; and
estimating a second change of momentum associated with at least a second set of actions;
determining whether the first change of momentum is less than or equal to the second change of momentum;
in response to determining that the first change of momentum is less than or equal to the second change of momentum, determining that the first vehicle is to perform the first set of actions, the first set of actions being the determined one or more actions; and
in response to determining that the first change of momentum is greater than the second change of momentum, determining that the first vehicle is to perform the second set of actions, the second set of actions being the determined one or more actions.

6. The method of claim 1, wherein the one or more control components further comprise a steering system of the first vehicle, and wherein the one or more control signals further comprise:
a second control to the steering system of the first vehicle that causes the first vehicle to steer in a predetermined direction at a first predetermined time.

7. The method of claim 1, wherein said determining the one or more actions comprises:
determining that the second vehicle is to collide with first vehicle at the rear of the first vehicle;
determining that a third vehicle is in front of the first vehicle;
determining a third plurality of characteristics of the third vehicle; and
determining the one or more actions to be performed by the first vehicle that reduces the change of momentum to be experienced by the one or more occupants of the first vehicle as a result of the collision based at least in part on the first plurality of characteristics, the second plurality of characteristics, and the third plurality of characteristics.

8. The method of claim 7, wherein the third plurality of characteristics comprises at least one of:
an estimated velocity of the third vehicle;
a mass of the third vehicle; or
an estimate of energy absorbed at the time of impact by one or more determined crumple zones of the third vehicle.

9. The method of claim 7, wherein the one or more control signals further comprise one or more of:
a second control signal to the acceleration system of the first vehicle that causes the first vehicle to accelerate and collide with the third vehicle at a first predetermined time; or a third control signal to a steering system of the first vehicle that causes the first vehicle to steer into the third vehicle at a second predetermined time.

10. A system in a first vehicle, comprising:
one or more sensors;
one or more processing units communicatively coupled to the one or more sensors; and
one or more control components communicatively coupled to the one or more processing units, the one or more processing units configured to:
receive sensor data from the one or more sensors of the first vehicle;
determine a first plurality of characteristics of a second vehicle based at least in part on the sensor data and a second plurality of characteristics of the first vehicle;
determine that a collision is to occur between the first vehicle and the second vehicle based at least in part on the first plurality of characteristics and the second plurality of characteristics;
determine a start time at which the first vehicle is to be accelerated based on a distance between the first vehicle and the second vehicle and initial acceleration capabilities of the first vehicle;
determine one or more actions to be performed by the first vehicle that reduces a change of momentum to be experienced by one or more occupants of the first vehicle as a result of the collision based at least on part on the first plurality of characteristics and the second plurality of characteristics; and
provide one or more control signals to the one or more control components of the first vehicle that cause the first vehicle to perform the one or more actions, the one or more control components comprising an acceleration system of the first vehicle, the one or more control signals comprising a first control signal to the acceleration system that causes the first vehicle to accelerate at the start time.

11. The method of claim 1, wherein the one or more sensors comprise at least one or more cameras and one or more of a RADAR-based device, a LIDAR-based device, or a proximity sensor.

12. The system of claim 10, wherein the first plurality of characteristics comprises at least one of:
an estimated velocity of the second vehicle before the collision;
a direction from which the second vehicle is approaching the first vehicle;
a mass of the second vehicle;
a braking force associated with the second vehicle;
an estimate of velocity of the second vehicle at a time of collision between the second vehicle and the first vehicle; or
an estimate of energy absorbed at the time of impact by one or more determined crumple zones of the second vehicle.

13. The system of claim 10, wherein the second plurality of characteristics comprise at least one of:
a mass of the first vehicle;
braking capabilities of the first vehicle;
the initial acceleration capabilities of the first vehicle;
steering capabilities of the first vehicle; or
an estimate of energy absorbed at the time of impact by one or more crumple zones of the first vehicle.

14. The system of claim 10, wherein, to determine the one or more actions, the one or more processing units are configured to:

estimate a first change of momentum associated with at least a first set of actions to be performed by the first vehicle;

estimate a second change of momentum associated with at least a second set of actions;

determine whether the first change of momentum is less than or equal to the second change of momentum;

in response to the first change of momentum being determined to be less than or equal to the second change of momentum, determine that the first vehicle is to perform the first set of actions, the first set of actions being the determined one or more actions; and in response to the first change of momentum being determined to be greater than the second change of momentum, determine that the first vehicle is to perform the second set of actions, the second set of actions being the determined one or more actions.

15. The system of claim 10, wherein the one or more control signals further comprise:

a second control to a steering system of the first vehicle that causes the first vehicle to steer in a predetermined direction at a first predetermined time.

16. The system of claim 10 wherein, to determine the one or more actions, the one or more processing units are configured to:

determine that the second vehicle is to collide with first vehicle at the rear of the first vehicle;

determine that a third vehicle is in front of the first vehicle;

determine a third plurality of characteristics of the third vehicle; and determine the one or more actions to be performed by the first vehicle that reduces the change of momentum to be experienced by the one or more occupants of the first vehicle as a result of the collision based at least in part on the first plurality of characteristics, the second plurality of characteristics, and the third plurality of characteristics.

17. The system of claim 15, wherein the third plurality of characteristics comprises at least one of:

an estimated velocity of the third vehicle;

a mass of the third vehicle; or an estimate of energy absorbed at the time of impact by one or more determined crumple zones of the third vehicle.

18. The system of claim 15, wherein the one or more control components further comprise a steering system of the first vehicle, and wherein the one or more control signals further comprise one or more of:

a second control signal to the acceleration system of the first vehicle that causes the first vehicle to accelerate and collide with the third vehicle at a first predetermined time; or a third control signal to the steering system of the first vehicle that causes the first vehicle to steer into the third vehicle at a second predetermined time.

19. A non-transitory computer-readable storage medium having program instructions recorded thereon that, when executed by at least one processing circuit, perform a method for reducing a change of momentum to be experienced by one or more occupants of a first vehicle during a collision with a second vehicle, the method comprising:

receiving sensor data from one or more sensors of the first vehicle;

determining a first plurality of characteristics of the second vehicle based at least in part on the sensor data and a second plurality of characteristics of the first vehicle;

determining that a collision is to occur between the first vehicle and the second vehicle based at least in part on the first plurality of characteristics and the second plurality of characteristics;

determining a start time at which the first vehicle is to be accelerated based on a distance between the first vehicle and the second vehicle and initial acceleration capabilities of the first vehicle;

determining one or more actions to be performed by the first vehicle that reduces the change of momentum to be experienced by the one or more occupants of the first vehicle as a result of the collision based at least in part on the first plurality of characteristics and the second plurality of characteristics; and providing one or more control signals to one or more control components of the first vehicle that cause the first vehicle to perform the one or more actions, the one or more control components comprising an acceleration system of the first vehicle, the one or more control signals comprising a first control signal to the acceleration system that causes the first vehicle to accelerate at the start time.

20. The non-transitory computer-readable storage medium of claim 18, wherein the one or more sensors comprise at least one or more cameras and one or more of a RADAR-based device, a LIDAR-based device, or a proximity sensor.

* * * * *